US008277865B2

(12) United States Patent
Bunke et al.

(10) Patent No.: US 8,277,865 B2
(45) Date of Patent: *Oct. 2, 2012

(54) NUTRITIOUS FABRICATED SNACK PRODUCTS

(76) Inventors: Paul Ralph Bunke, Cincinnati, OH (US); Athula Ekanayake, Cincinnati, OH (US); Priscilla G Hammond, Cincinnati, OH (US); Robert Lawrence Prosise, Cincinnati, OH (US); Peter Yen-Chih Lin, Cincinnati, OH (US); Sharon Lee Schnur, Fairfield, OH (US)

( * ) Notice: Subject to any disclaimer, the term of this patent is extended or adjusted under 35 U.S.C. 154(b) by 705 days.

This patent is subject to a terminal disclaimer.

(21) Appl. No.: 12/070,031

(22) Filed: Feb. 14, 2008

(65) Prior Publication Data
US 2008/0213432 A1 Sep. 4, 2008

Related U.S. Application Data

(60) Provisional application No. 60/904,690, filed on Mar. 2, 2007.

(51) Int. Cl.
*A23L 1/0522* (2006.01)
*A23L 1/217* (2006.01)
(52) U.S. Cl. ......... 426/615; 426/520; 426/661; 426/808
(58) Field of Classification Search .................. 426/615, 426/661, 520, 808
See application file for complete search history.

(56) References Cited

U.S. PATENT DOCUMENTS

| | | | |
|---|---|---|---|
| 3,006,773 A | 10/1961 | Fitzgerald | |
| 3,406,078 A | 10/1968 | Morimoto | |
| 3,505,076 A | 4/1970 | Maloney | |
| 3,512,993 A | 5/1970 | Conley | |
| 3,652,294 A * | 3/1972 | Marotta et al. ............... | 426/250 |
| 3,684,527 A | 8/1972 | Walters | |
| 3,703,378 A | 11/1972 | Bretch | |
| 3,962,355 A | 6/1976 | Yamazaki | |
| 4,055,675 A | 10/1977 | Popper | |
| 4,059,046 A | 11/1977 | Yamazaki | |
| 4,118,516 A | 10/1978 | Van Praag et al. | |
| 4,140,803 A | 2/1979 | Panchuk | |
| 4,208,434 A | 6/1980 | Iacobucci et al. | |
| 4,341,803 A | 7/1982 | Koshida | |
| 4,413,017 A | 11/1983 | Loader | |
| 4,515,822 A | 5/1985 | Kraig | |
| 4,542,033 A | 9/1985 | Agarwala | |
| 4,569,848 A | 2/1986 | Giorgetti | |
| 4,681,770 A | 7/1987 | Palmer | |
| 4,705,693 A | 11/1987 | Mitra | |
| 4,710,390 A | 12/1987 | Schumacher et al. | |
| 4,713,252 A | 12/1987 | Ismail | |
| 4,735,808 A | 4/1988 | Scaglione | |
| 4,753,816 A | 6/1988 | Vink et al. | |
| 4,767,630 A | 8/1988 | Silver | |
| 4,810,517 A | 3/1989 | Glittenberg | |
| 4,844,936 A | 7/1989 | Cox | |
| 4,847,098 A | 7/1989 | Langler | |
| 4,853,236 A | 8/1989 | Langler | |
| 4,859,481 A | 8/1989 | Matsumura | |
| 4,859,487 A | 8/1989 | Matsumura | |
| 4,876,102 A | 10/1989 | Freeney | |
| 4,879,122 A | 11/1989 | Seely, Jr. | |
| 4,888,187 A | 12/1989 | Given, Jr. | |
| 4,889,730 A | 12/1989 | Roberts | |
| 4,940,593 A | 7/1990 | Duffy | |
| 4,961,943 A | 10/1990 | Blanthorn | |
| 4,970,084 A | 11/1990 | Pirrotta | |
| 4,971,824 A | 11/1990 | Jonas | |
| 5,000,972 A | 3/1991 | Nafisi-Movaghar | |
| 5,063,073 A | 11/1991 | Kratochvil | |
| 5,080,918 A | 1/1992 | Beauvais | |
| 5,132,127 A | 7/1992 | Wisdom | |
| 5,134,162 A | 7/1992 | Stanko | |
| 5,137,744 A | 8/1992 | Cagley et al. | |
| 5,188,861 A | 2/1993 | Mazin | |
| 5,223,287 A | 6/1993 | Kearns | |
| 5,264,238 A | 11/1993 | Taga | |
| 5,492,715 A | 2/1996 | Greenland | |
| 5,498,438 A | 3/1996 | Strong | |
| 5,514,397 A | 5/1996 | Shapiro | |
| 5,523,106 A | 6/1996 | Gimmler et al. | |
| 5,549,923 A | 8/1996 | Finnochiaro | |
| 5,554,406 A | 9/1996 | Muenz | |

(Continued)

FOREIGN PATENT DOCUMENTS

EP 0 339 175 A1 12/1988
(Continued)

OTHER PUBLICATIONS

XP-002521823—"Krabbenchips"; Wikipedia, Die Freie Enzyklopadie—Sep. 13, 2006—English Translation.

(Continued)

*Primary Examiner* — Helen F Heggestad
(74) *Attorney, Agent, or Firm* — Dickinson Wright PLLC

(57) ABSTRACT

A snack chip comprising from about 15% to about 60% of vegetable material; from about 40% to about 65% of starch material made from materials selected from the group consisting of tapioca, rice and mixtures thereof; from about 0.1% to about 3.0% water; and from about 1% to about 20% of optional ingredients. At least about 40% of the starch material is pre-gelatinized. The snack chip can be made by combining the vegetable material and dry ingredients with water to form a dough which is then sheeted, dried without the use of a heated extruder to form a half product, which is cooked to form the snack chip.

4 Claims, No Drawings

U.S. PATENT DOCUMENTS

| | | | |
|---|---|---|---|
| 5,616,355 A | 4/1997 | Haast | |
| 5,690,725 A | 11/1997 | Tucker | |
| 5,718,931 A | 2/1998 | Walter | |
| 5,789,012 A | 8/1998 | Slimak | |
| 5,840,354 A | 11/1998 | Baumann | |
| 5,922,382 A | 7/1999 | Powrie | |
| 5,962,057 A | 10/1999 | Durance | |
| 6,017,571 A | 1/2000 | Cross | |
| 6,020,016 A | 2/2000 | Castleberry | |
| 6,027,758 A | 2/2000 | McHugh et al. | |
| 6,033,696 A | 3/2000 | Aebischer | |
| 6,077,557 A | 6/2000 | Gordon | |
| 6,086,933 A | 7/2000 | Rockstrom | |
| 6,110,511 A | 8/2000 | Rollins | |
| 6,113,968 A | 9/2000 | McGuire | |
| 6,132,786 A | 10/2000 | Poulos | |
| 6,143,339 A | 11/2000 | Weinstein | |
| 6,171,631 B1 | 1/2001 | Willoughby | |
| 6,183,795 B1 | 2/2001 | Yates | |
| 6,200,617 B1 | 3/2001 | Babiarz | |
| 6,350,477 B1 | 2/2002 | Yamamoto | |
| 6,352,738 B1 | 3/2002 | Carels | |
| 6,358,544 B1 | 3/2002 | Henry, Jr. | |
| 6,387,421 B1 | 5/2002 | Clanton | |
| 6,458,405 B1 | 10/2002 | Roy | |
| 6,468,573 B1 | 10/2002 | Herrick | |
| 6,509,054 B1 | 1/2003 | Haddad | |
| 6,558,730 B1 | 5/2003 | Gisaw et al. | |
| 6,579,555 B1 | 6/2003 | Weinstein et al. | |
| 6,599,547 B1 * | 7/2003 | Martinez-Serna Villagran et al. | 426/242 |
| 6,623,779 B1 | 9/2003 | Huxsoll et al. | |
| 6,958,164 B2 | 10/2005 | Dutta-Roy | |
| 7,008,665 B2 | 3/2006 | Loh | |
| 7,264,841 B2 | 9/2007 | Lester | |
| 2002/0028197 A1 | 3/2002 | Fitchett | |
| 2002/0127319 A1 | 9/2002 | Gare | |
| 2002/0192345 A1 | 12/2002 | Kepplinger | |
| 2002/0197361 A1 | 12/2002 | Ehrman | |
| 2003/0008042 A1 | 1/2003 | Khalsa | |
| 2003/0017254 A1 | 1/2003 | Fulbright | |
| 2003/0148000 A1 | 8/2003 | Miller | |
| 2003/0185876 A1 | 10/2003 | Calton | |
| 2003/0185961 A1 | 10/2003 | Sault | |
| 2003/0232110 A1 | 12/2003 | Hayabach | |
| 2004/0013771 A1 | 1/2004 | Funk | |
| 2004/0067282 A1 | 4/2004 | Karwowski | |
| 2004/0109922 A1 | 6/2004 | Thai | |
| 2004/0191377 A1 | 9/2004 | Malleshi | |
| 2004/0208980 A1 | 10/2004 | Merolla | |
| 2004/0241287 A1 | 12/2004 | Bastiaans | |
| 2004/0265441 A1 | 12/2004 | Stanley | |
| 2005/0064082 A1 | 3/2005 | Froseth | |
| 2005/0158446 A1 | 7/2005 | Lester | |
| 2005/0175720 A1 | 8/2005 | McKenzie | |
| 2005/0202142 A1 | 9/2005 | Bosch | |
| 2005/0255229 A1 | 11/2005 | Liukko | |
| 2006/0013925 A1 | 1/2006 | Bauman | |
| 2006/0034976 A1 | 2/2006 | Cotten | |
| 2006/0040001 A1 | 2/2006 | Johnson | |
| 2006/0045924 A1 | 3/2006 | Chen | |
| 2006/0051472 A1 | 3/2006 | Koda | |
| 2007/0269564 A1 | 11/2007 | Bertocchi | |
| 2008/0102182 A1 | 5/2008 | McCall et al. | |
| 2008/0145503 A1 | 6/2008 | McCall et al. | |
| 2008/0182003 A1 | 7/2008 | Baker et al. | |
| 2008/0182004 A1 | 7/2008 | Baker et al. | |

FOREIGN PATENT DOCUMENTS

| | | |
|---|---|---|
| EP | 0 325 478 A2 | 1/1989 |
| EP | 0331281 B1 | 3/1993 |
| EP | 0405650 B1 | 3/1993 |
| EP | 0337621 B1 | 6/1993 |
| EP | 0363879 B1 | 6/1993 |
| EP | 0461605 B1 | 3/1995 |
| EP | 0681785 B1 | 10/1999 |
| EP | 1 064 854 | 1/2001 |
| EP | 0857022 B1 | 7/2003 |
| EP | 1 470 759 A | 10/2004 |
| EP | 1470759 A1 | 10/2004 |
| EP | 1541026 A1 | 6/2005 |
| EP | 1 872 666 A | 1/2008 |
| GB | 1180686 A | 2/1970 |
| GB | 12005323 A | 7/1970 |
| GB | 1477753 A | 6/1977 |
| GB | 2166638 A | 5/1986 |
| GB | 1463073 A | 2/1997 |
| GB | 2 428 958 A | 2/2007 |
| JP | 55045332 A | 3/1980 |
| JP | 59159739 A | 9/1984 |
| JP | 61242556 A | 10/1986 |
| JP | 61265046 A | 11/1986 |
| JP | 63304941 A | 12/1988 |
| JP | 01101854 A | 4/1989 |
| JP | 01148162 A | 6/1989 |
| JP | 02060575 A | 3/1990 |
| JP | 03210165 A | 9/1991 |
| JP | 04004845 A | 1/1992 |
| JP | 04190757 A | 7/1992 |
| JP | 05292901 A | 11/1993 |
| JP | 05292914 A | 11/1993 |
| JP | 05304917 A | 11/1993 |
| JP | 05336888 A | 12/1993 |
| JP | 07298853 A | 11/1995 |
| JP | 10099013 A | 4/1998 |
| JP | 2006/342161 A | 12/2006 |
| WO | WO 9415786 A1 | 7/1994 |
| WO | WO 96/01572 A | 1/1996 |
| WO | WO 96/33624 A1 | 10/1996 |
| WO | WO 97/06691 A1 | 2/1997 |
| WO | WO 00/24271 A1 | 10/1999 |
| WO | WO 00/55043 A1 | 9/2000 |
| WO | WO 00/78163 A2 | 12/2000 |
| WO | WO 0143564 A1 | 6/2001 |
| WO | WO 02/47491 A1 | 6/2002 |
| WO | WO 03/079813 A1 | 10/2003 |
| WO | WO 2004/008881 A1 | 1/2004 |
| WO | WO 2004/047542 A1 | 6/2004 |
| WO | WO 2004/069143 A2 | 8/2004 |
| WO | WO 2004/086881 A1 | 10/2004 |
| WO | WO 2004/112491 A2 | 12/2004 |
| WO | WO 2005/036993 A2 | 4/2005 |
| WO | WO 2005/046336 A1 | 5/2005 |
| WO | WO 2005/087018 A1 | 9/2005 |
| WO | WO 2006/002738 A1 | 1/2006 |
| WO | WO 2006/014878 A1 | 2/2006 |
| WO | WO 2006/133388 A3 | 12/2006 |

OTHER PUBLICATIONS

PCT International Search Report Dated Apr. 27, 2009—5 pgs.
U.S. Appl. No. 12/156,076, filed May 29, 2008, Paul Ralph Bunke.
U.S. Appl. No. 12/228,238, filed Aug. 11, 2008, Paul Ralph Bunke.
U.S. Appl. No. 12/228,228, filed Aug. 11, 2008, Paul Ralph Bunke.

* cited by examiner

NUTRITIOUS FABRICATED SNACK PRODUCTS

CROSS-REFERENCE TO RELATED APPLICATIONS

This application claims priority to and the benefit of U.S. Provisional application 60/904,690, filed on Mar. 2, 2007, which is hereby incorporated by reference herein in its entirety.

FIELD

The present invention relates to nutritious fabricated snack products that have authentic flavor.

BACKGROUND

Fabricated snack products prepared from dough comprising starch-based materials are well-known in the art. Potato based dough, and the snacks made therefrom are especially well known. These doughs are typically fried in oil or baked to form the snack chip. Consumers are, however, looking for snack products that contain healthful ingredients other than starch materials. Moreover, consumers have demanded better flavor and nutrition in snack chips. While all age groups eat snacks, children are heavy consumers of these products and it would be highly desirable if children could get more nutrition from a snack product that they enjoy eating. And even more desirable would be to produce a good tasting snack product without artificial flavors and preservatives. Even more preferred would be a snack product that can provide a full or half serving of fruit, vegetables, dairy or protein (as defined by the United States Center for Disease Control, Atlanta Ga.) in a serving, especially if the snack were low fat and had less than 125 calories.

For example, consumers like to have fruit and vegetable based snacks. Although fruit and vegetable snacks exist, many are freeze-dried or vacuum fried, resulting in a layered or foamy texture and many lack flavor. The foam structure usually consists of large and small cells randomly occurring in the structure. The fruit snacks are mainly in the form of fruit leathers, fruit brittles or bars which have high levels of sugar, undesirable texture and lack the natural flavor essence of the fruit. Snacks made from these processes tend to develop off flavors, either due to (a) processing (e.g., frying, drying, dehydrating, and other processing), (b) preservatives or pre-treatment of ingredients (sulfur dioxide, bisulfite materials or organic acids such as ascorbic or citric acid) or (c) interactions between the chemicals present in the ingredients themselves. For example, the preservatives, or acids naturally present in fruit and vegetables can react with the sugars and amino acids naturally present and increase the browning reactions during cooking and other processing steps. Moreover, added preservatives are unacceptable in natural products and those that claim to be "preservative free". For these reasons crisp fruit and vegetable snacks that retain their natural flavor have proven difficult to make in a consumer acceptable format.

Likewise, meats, cheeses, nuts, fish, whole grains, eggs, and other nutritional foods are equally desirable for use in snack foods, but they are also hard to formulate in a consumer acceptable snack product. The oil content as well as protein or fiber content present a challenge in formulation.

More specifically, the relatively high temperatures and/or long cooking times necessary to produce a crisp snack product degrade the flavor of these nutritional additives such as, fruits, vegetables, meat, cheese, fish and the like. The nutritional value of these materials is often degraded during the cooking process as well, particularly when high shear extrusion or steaming is used during processing. Thus, commercially available fabricated snacks contain low levels of these ingredients and rarely utilize the raw ingredients such as fresh fruit, vegetables, and the like and thus lack the "authentic flavor" and nutritional value of the main ingredient.

"Authentic flavor" as used herein refers to consumer recognition of the flavor as the flavor of the nutritional component, such as, apple, tomato, carrot, shrimp, tuna, or even combined flavors as salsa or pizza. For example, the flavor of a fabricated apple chip should taste like a fresh apple without the addition of artificial apple flavor. Likewise, a corn or shrimp based chip should taste like cooked corn or shrimp without the addition of artificial flavors.

There are many reasons for the degradation of the natural flavor and nutritional value in fabricated snack chips comprising fruits, vegetables, meats, cheeses, nuts, fish, whole grains, eggs, and the like. Many of these products are high in moisture, especially fresh fruit. But snack chips, even those made with fruit, must be low in moisture content to make them crisp and to maintain shelf stability without preservatives. While the water content of the dough can be controlled to some extent, the total moisture content of the snack product must be lowered. This dehydration is usually done by steaming, baking or frying. If the snack chip is to be fried in hot oil, as most are, the dough must be relatively low in moisture before frying to remain low in total fat content as well as to meet the desired caloric content.

The binder in a fabricated chip is typically a starch material that is pregelled or heated as part of the processing. For example, shrimp chips are very popular in many countries. The comminuted shrimp is typically mixed with a bland starch material, for example, rice, and then the dough is cooked at high temperatures to gelatinize the starch and cook the shrimp. This first step has a negative effect on the authenticity of the shrimp flavor and may degrade some of the nutrients as well. The dough is then dried into a "half-product" or intermediate product which is shelf stable. The method of drying can also be detrimental to the remaining flavor and nutrition of the product. Finally, some finishing processes such as frying, baking, microwaving or the like, to make a crisp snack product, also are detrimental to flavor and nutrition.

In the past, the addition of pieces of the nutritional food ingredients into a starch based dough, for example, pieces of fruit, vegetable, meat, cheese and the like, resulted in a product with burnt pieces of the additive and often off-flavors. These products did not taste good and sometimes had dark or burnt specks.

Hence, there exists a need for formulae, doughs and processes for making fabricated snack products with relatively high concentrations of non-starch ingredients, for example, fruits, vegetables, meats, cheeses, nuts, fish, whole grains, eggs, and the like, while maintaining certain textural and taste qualities that consumers prefer. And there is a need for a fruit containing snack product that is made from a sheet of dough or extruded, and then fried, partially fried and then baked, or baked that tastes good.

These and other advantages of the invention will become apparent from the following disclosure.

SUMMARY

Embodiments of the present invention provide a snack chip comprising: from about 15% to about 60% of vegetable material; from about 40% to about 65% of starch material selected from the group consisting of tapioca, rice, and mixtures thereof, from about 0.1% to about 5.0% water; and from about 1% to about 20% of optional ingredients. Further, at least about 40% of the starch material used in the snack chips is pre-gelatinized. The optional ingredients are selected from the group consisting of natural or artificial flavors, oatmeal, fruits, nuts, flavor enhancers, fats and oils, natural sweeteners, artificial sweeteners, non-digestible fats or oils, vitamin or minerals and mixtures thereof. Typically, salt, sugar, butter, artificial butter or spice flavors, artificial sweeteners, oil, and vegetable pieces are used.

In another aspect of the present invention the snack chip is made by combining the vegetable material and dry ingredients with water to form a sheetable dough. The dough is mixed and sheeted without passing through a cooking extruder. The sheeted dough is cut and dried to form a fabricated snack product or "half product". The dough is dried at a temperature of less than about 250° F. to form a half product. Half products are shelf stable and can be stored and cooked later. The half product can also be cooked immediately after the drying process to form the snack chip by baking, frying in oil, vacuum, microwave and mixtures of these methods.

Some embodiments of the present invention deliver a snack chip that has a high concentration of non-starch ingredients, such as dairy, fruit, vegetable, meat, or protein ingredients. For example, fruits, vegetables, meats, cheeses, nuts, fish, whole grains, eggs, and the like, can be included in the snack chip. The snack chip further can retain both the authentic and natural flavors and nutritional benefits of the non-starch ingredient. Moreover, the snack chips provide consumer acceptable taste without the need for added artificial flavors to mimic the main natural ingredient. They are preferably formulated to provide a half serving or more, even up to and including a full serving, of fruit, vegetable, dairy or protein (as defined by the United States Center for Disease Control, Atlanta, Ga.) in a single serving of snack chips and at less than 125 calories per serving. The snack chips can also have a crispy and crunchy texture, and appealing appearance to consumers. Further, the dough and snacks made therefrom are low in fat and have few off-flavors.

DETAILED DESCRIPTION

A. Definitions

As used herein "gelatinized starch" includes any type of starch that has been treated to gelatinize the starch. Processed or commercial starches have had most of the moisture removed and they are generally insoluble in water. As starch and water are heated, the grains or granules absorb water. Generally, up to 60° to 70° C., this absorption is reversible. However as heating is continued the swelling of the granule is irreversible and this is when gelatinization begins. The exact gelatinization temperature is dependent on the starch. Gelatinization is usually evidenced by increased translucency of the starch and increased viscosity of the solution. Starch also loses it birefringence when gelatinized.

Gelatinized starches as used herein include fully gelatinized, partially gelatinized, and pregelatinized starches. Gelatinized starches can include, but are not limited to, those which have been treated by parboiling, cooking, partially cooking, and extruded flours.

As used herein, "pre-gelatinized" means the starch has been treated to gelatinize it. Pre-gelatinized starch is usually a dry powder. Pre-gelatinizing is done before the starch is used to make the dough.

As used herein "vegetable materials" refers to raw materials, such as for example raw carrots, or any intermediate source of fruit with a moisture content below 15%. Examples are vegetable based flour, vegetable based pellets, extruded vegetable products, dried vegetable pieces, vacuum fried vegetable pieces, air puffed vegetable containing pieces, and combinations thereof.

As used herein "nutritional additives" refers to any food that is part of the Food Guide Pyramid (as defined by the United States Center for Disease Control, Atlanta, Ga.). These include fruits, vegetables, proteins or meats, dairy products, and fats. Others include cheeses, nuts, fish, whole grains, eggs, and the like. Fiber enriched foods are also nutritional additives. These nutritional additives may be dehydrated to a moisture content of less than about 15%, or used in their fresh, natural state.

As used herein, the term "fabricated" refers to food products made from doughs comprising flour, meal, and/or starch, such as those derived from tubers, grains, legumes, cereals, roots, or mixtures thereof. For example, a potato chip that is prepared by frying a portion of a potato is not fabricated, but a potato chip made of potato flakes and starch made into a dough piece that is fried is a fabricated potato chip.

As used herein, "native starch" refers to starch that has not been pre-treated or cooked in any way, and includes but is not limited to hybrid starches.

As used herein, "dehydrated potato products" includes, but is not limited to, potato flakes, potato flanules, potato granules, potato agglomerates, any other dehydrated potato material, and mixtures thereof.

As used herein, "sheetable dough" is cohesive dough capable of being placed on a smooth surface and rolled to the desired final thickness without tearing or forming holes. Sheetable dough can also include dough that is capable of being formed into a sheet by rolling or pressing between two belts or through a low work, low temperature process.

As used herein, "starch" refers to the isolated portion of a flour of a native or an unmodified carbohydrate polymer containing both amylose and/or amylopectin. It is derived from legumes, grain, roots, and tubers such as, but not limited to, wheat, corn, tapioca, sago, rice, potato, oat, barley, and amaranth. Starch as used herein, also refers to modified starch including but not limited to hydrolyzed starches such as maltodextrins, high amylose corn maize, high amylopectin corn maize, pure amylose, chemically substituted starches, crosslinked starches, and other modifications including but not limited to chemical, physical, thermal, or enzymatic and mixtures thereof.

As used herein, "starch-based flour" refers to a flour having high levels of starch that is derived from a starched based food material and is in either natural, dehydrated (e.g., flakes, granules, meal) or flour form. Starch-based flour can include, but is not limited to, potato flour, potato granules, potato flanules, potato flakes, corn flour, masa corn flour, corn grits, corn meal, rice flour, buckwheat flour, oat flour, bean flour, barley flour, tapioca, and mixtures thereof. For example, the starch-based flour can be derived from tubers, legumes, grain, or mixtures thereof.

As used herein the term "emulsifier" refers to emulsifier that has been added to the dough ingredients. Emulsifiers that are inherently present in the dough ingredients, such as in the case of the potato flakes (where emulsifier is used as a processing aid during manufacturing), are not included in the term "emulsifier."

The terms "fat" and "oil" are used interchangeably herein unless otherwise specified. The terms "fat" or "oil" refer to edible fatty substances in a general sense, including natural or synthetic fats and oils consisting essentially of triglycerides, such as, for example soybean oil, corn oil, cottonseed oil, sunflower oil, palm oil, coconut oil, canola oil, fish oil, lard and tallow, which may have been partially or completely hydrogenated or modified otherwise, as well as non-toxic fatty materials having properties similar to triglycerides, herein referred to as non-digestible fats, which materials may be partially or fully indigestible. Reduced calorie fats and edible non-digestible fats, oils or fat substitutes are also included in the term.

The term "non-digestible fat" refers to those edible fatty materials that are partially or totally indigestible, e.g., polyol fatty acid polyesters, such as OLEAN™. The preferred non-digestible fats are fatty materials having properties similar to triglycerides, such as sucrose polyesters. These preferred non-digestible fats are described in U.S. Pat. No. 5,085,884, issued Feb. 4, 1992 to Young et al. and U.S. Pat. No. 5,422,131, issued Jun. 6, 1995 to Elsen et al. An especially preferred brand of non-digestible fats is sold under the trade name OLEAN™.

By the term "dry blend" it is meant herein the dry raw material mixed together prior to processing of the materials so mixed.

All percentages are by weight unless otherwise specified.

All documents cited herein are, in relevant part, incorporated by reference; the citation of any document is not to be construed as an admission that it is prior art with respect to the present invention.

B. Snack Chips

At least one embodiment of the present invention can deliver a snack that has a high concentration of dehydrated and optionally fresh nutritional ingredients. They are preferably formulated to also provide greater than half and more preferably, greater than one serving of fruit, vegetable, dairy or protein (as defined by the United States Center for Disease Control, Atlanta, Ga.) in a single 28 gram (or 30 gram) serving of snack and less than 125 calories per serving. Embodiments of the present invention can also deliver, for example, fruits, vegetables, meats, cheeses, nuts, fish, whole grains, eggs, and the like, in a snack that provides a natural flavor and a nutritional benefit from the ingredients. Moreover, the nutritional snacks of embodiments of the present invention can be formulated without a need for added flavors to mimic the main natural ingredient. The snacks of embodiments of this invention can have a crispy and crunchy texture, and appealing appearance to consumers. Further, the dough and snacks made therefrom are low in off-flavors.

"Snack" and "Snack chip" are used interchangeably throughout and mean a product consumable by humans and other animals. Non-limiting examples of snacks and snack chips include products such as breads, crackers, fried snacks, fruit and vegetable snacks, baked or dried snacks, dog foods, dog biscuits and any other suitable food product.

The present snacks comprise:
a) from about 15% to about 60% of vegetable material;
b) from about 40% to about 65% of starch material made from materials selected from the group consisting of tapioca, rice, and mixtures thereof;
c) from about 0.1% to about 5.0%, preferably from about 0.2% to about 4%, and more preferably from about 0.3% to about 3%, by weight, water; and
d) from about 1% to about 20% of optional ingredients The snacks are preferably made by combining the vegetable material and dry ingredients with water to form a dough which is then sheeted. The sheeted dough is dried to form a fabricated snack product or "half product" which is a shelf stable intermediate. The mixing and drying are done using low work input and drying temperatures below 250° C. The fabricated snack product can be cooked by baking, frying in oil, vacuum, microwave and mixtures of these to make the nutritional snack. The snack chip expands during the final cooking to provide a crisp texture.

C. Vegetable Material

The vegetable material is preferably selected from the group consisting of carrots, broccoli, cauliflower, celery, peppers, tomatoes, pumpkin, squash and mixtures thereof, preferably the vegetable material is selected from the group consisting of carrots, broccoli, cauliflower, celery, peppers, tomatoes and mixtures thereof. Preferably, the vegetable material is at least about 90% or more derived from carrots. And even more preferably, at least from about 5% to about 70%, by weight of the vegetable material, is derived from raw chopped carrots The vegetables used herein can be fresh, frozen, juiced, pureed, fully hydrated, or partially dehydrated. Preferably the snack chips comprise from about 5% to about 60%, by weight of the snack chip, chopped, raw vegetables.

Also, the vegetables can be ground to a specific particle size distribution (from flour to agglomerates, pieces, extrudates, and co-extrudates). The level of vegetable materials in the formula varies from about 20% to about 50%, preferably from about 25% to about 40% and more preferably from about 25% to about 35%, by weight of the dry ingredients in the dough (that is, the dough weight less the weight of the added water).

Vegetable purees can also be used to make the dough. When a vegetable puree is used, the added water content of the dough is adjusted to accommodate the water in the puree.

C. Starch Materials

As discussed above, to maximize the benefits of the vegetable materials, the dough of at least one embodiment the present invention should include from about 40%, to about 65%, preferably, from about 45% to about 55%, by weight of the snack chip of starch material made from materials selected from the group consisting of tapioca, rice and mixtures thereof. Preferably, the starch material is tapioca.

The starch material helps to display the authentic vegetable flavor of the vegetable snack. Moreover, rice and tapioca based starch provide a neutral and clean flavor allowing the vegetable flavor to come through easier. Rice and tapioca have naturally bland flavors that do not mask the vegetable flavor like corn or potato flours will.

Further, at least about 40% of the starch material used in the snack chips can be pre-gelatinized. That is, at least a portion of the starch is cooked before adding the non-starch ingredients. Prior fabrications and formulae allowed for mixing the main ingredients and the starch and then cooking, that is, gelatinizing them both in-situ. In-situ gelatinization requires that the dough have very high moisture content, or that moisture loss be controlled by pressure cooking or other methods know in the art. Regardless, the harsh conditions of in-situ gelatinization tend to destroy flavor and it is believed that the nutritional value of the nutritional ingredients is degraded as well.

While not wanting to be bound by any one theory, it is believed that in-situ gelatinization with, for example steam, breaks down the starch cells and frees up the amylose within the cells. The amylose may complex with flavor components resulting in a trapping of the flavor components. Moreover, in-situ gelatinization can cause the snack chip to be puffy and have an undesirable texture for a crisp chip. In pre-gelatinized starch, the cells are largely intact.

The starch materials serve also as processing and formulation additives that provide a better dough, resulting in a superior sheeted product from which the fabricated snack piece can be made.

Additional starch materials that can be used in the present invention include, but are not limited to, conventional rice flour, conventional tapioca flour, pre-gelatinized starches, low viscosity starches (e.g., dextrins, acid-modified starches, oxidized starches, enzyme modified starches), stabilized starches (e.g., starch esters, starch ethers), waxy rice starch or flour, cross-linked starches, acetylated starches, starch sugars (e.g. glucose syrup, dextrose, isoglucose) and starches that have received a combination of treatments (e.g., cross-linking and gelatinization) and mixtures thereof. Those skilled in the art will appreciate that the starch materials described herein are commercially available, for example, from Remy Industries N.V., Remylaan 4, B-3018 Leuven-Wijgmaal, Belgium. The conventional rice flour includes long grain, medium grain, short grain and sweet or grain rice can all be made into rice flour. In addition, rice flour can be made from broken pieces or whole pieces of rice. Rice flours made from these different types of rice vary in water absorption index, peak viscosity, final viscosity, and total amylose content. Furthermore, if the rice is partially or fully pre-cooked, parboiled, or pre-gelatinized in any other way prior to, or after, processing into rice flour, the rice flour properties can be further modified.

Mixing together the desired quantities of various tapioca and rice flours can be used to make the desired starch materials. This can be accomplished by any suitable means such as, but not limited to, mixing the grains before milling, or mixing the flours together after milling.

In a preferred embodiment, gelatinized tapioca flour and/or starch is used. In this embodiment, the composition can comprise a blend of one or more tapioca flours and/or starches that have been gelatinized to varying degrees. For example, the gelatinized tapioca flour and/or starch can comprise fully cooked tapioca, partially cooked tapioca, parboiled tapioca, extruded tapioca, or mixtures thereof. All of these methods are equally applicable to rice, and rice/tapioca blends. The fully cooked gelatinized rice or tapioca flour and/or starch is from about 75% to about 100% gelatinized, the partially cooked rice flour and/or starch and the extruded rice flour and/or starch is from about 25% to about 100% gelatinized, and the parboiled rice flour and/or starch is from about 75% to about 100% gelatinized.

Extrusion is the preferred method of gelatinizing the tapioca or rice flour and/or starch. Extrusion provides the cooking conditions required for the starch of the rice or tapioca flour and/or starch to completely cook, resulting in complete gelatinization and high levels of dextrinization of the starch—i.e., starch degradation. The use of extrusion to prepare the rice flours and/or starches can guarantee the absence of a raw starch taste or the powdery starchy aftertaste and the uncontrolled and excessive expansion in the finished product. As is discussed below, extrusion is not desired for use in drying the dough or cooking the snack chip. Extrusion, while preferred for use on the starch alone, is believed to degrade both the flavor and the nutritional value of the nutritional ingredients, in this case the added vegetable ingredient.

Optionally, an emulsifier can be added to the flour and/or starch material as a processing aide to complex the free amylose generated during cooking and/or milling. For example, monoglycerides can be added at a level ranging from about 0.2 to about 0.7%, and preferably from about 0.3% to about 0.5% (on a dry solids basis).

D. Fabricated Snack Product Preparation

The "fabricated snack product" of the present invention can be a "half-product". That means that it is dried, shelf stable and ready to cook. While the fabricated snack product can be consumed at this point, it is not in a consumer desirable form. More specifically, the taste and texture of a half-product is not so good.

The fabricated snack product can be made by combining the vegetable material and dry ingredients with water to form a dough which is then sheeted and dried. Preferably, the mixing is done with low work input and drying temperatures are less than about 250 F. To form the snack chip, the half-product can be cooked by any of the methods discussed herein, although extrusion is not preferred for reasons discussed above.

As discussed above, the present snacks provide substantial nutrition in a consumer acceptable format. That is, the present snacks are both tasty and nutritious. The present combination of composition and processing results in a snack that retains more nutritional elements, more flavor components, and produces fewer off-flavors. By way of example, a snack chip made with fresh or dehydrated apples will retain more of the essential nutrients of the original apple material than prior snacks. Likewise, important and desirable flavor notes of the apple are retained in greater quantities by the compositions and processes in accordance with embodiments of the present invention.

Although the use of the vegetable materials in combination with the starch materials will be described primarily in terms of a preferred fabricated snack product, it should be readily apparent to one skilled in the art that the dough formed with these compositions can be used in the production of any suitable food products. For instance, the dough can be used to produce food products such as breads, sauces, crackers, fried snacks, fruit and vegetable snacks, baked or dried snacks, coatings for fried foods, dog foods, dog biscuits and any other suitable food product. The production of the preferred fabricated snack product is set forth in detail below.

1. Dough Formulation

The preferred doughs of embodiments of the present invention comprise a dry blend and added water. Preferably, the doughs comprise from about 60% to about 85% dry blend which comprises the vegetable material, and from about 15% to about 40% water. Preferably the water is between about 15% and 35%, and even more preferably between about 15% and about 30%, by weight of the dough. The water is a combination of the water added with the vegetable material and added water. Thus, when dehydrated vegetable material is used essentially all of the water in the dough is added water. But when vegetable juice or vegetable puree is used, little or no added water is necessary. The dough can further comprise optional ingredients, including those that decrease the moisture content of the dough. For example, to lower the moisture content in the dough, the following ingredients can be added: 1) hydrolyzed starches into the dough, such as maltodextrins with low dextrose equivalent values; 2) polysaccharides such as Xanthenes, hydroxypropyl cellulose, and combinations; and 3) emulsifiers.

a. Dry Blend

Preferred doughs comprise from about 60% to about 85% dry blend, preferably from about 65% to about 75% dry blend.

The dry blend comprises the vegetable materials, the starch materials, and optional dry ingredients discussed below. Preferred dry blends comprise from about 20% to about 50%, by weight of the dry ingredients, vegetable materials; from about 40% to about 60%, by weight of the dry ingredients, starch material; and from 1% to about 30%, by weight of the dry ingredients, optional ingredients. Furthermore, the balance of the dry blend can comprise one or more other components including but not limited to, protein sources, fiber, minerals, vitamins, colorants, flavors, fruits pieces, vegetables, seeds, herbs, spices, and mixtures thereof. It is sometimes beneficial to coat these other components before they are added to the dry blend.

b. Added Water

Preferred dough compositions of embodiments of the present invention comprise from about 0% to about 40% added water, preferably from about 1% to about 35%, and more preferably from about 15% to about 30% added water. As described above, the water in the dough can be supplied by the vegetable material, with little or no added water being necessary to make the dough. If optional ingredients, such as maltodextrin or corn syrup solids, juices, or concentrates, are added as a solution, the water in the solution is included as added water. The amount of added water also includes any water used to dissolve or disperse ingredients.

c. Optional Ingredients

Any suitable optional ingredient may be added to the doughs. Such optional ingredients can include, but are not limited to polysaccharides such as: gums and fibers, emulsifiers, and mixtures thereof. Optional ingredients are preferably included at a level ranging from about 0% to about 50%, preferably, 0% to about 40%, by weight in the dough. Examples of suitable gums can be found in U.S. Pat. No. 6,558,730, issued May 6, 2003, to Gizaw et al. Optional ingredients include, but are not limited to, natural or artificial flavors, oatmeal, fruits, nuts, flavor enhancers, fats and oils, natural sweeteners, artificial sweeteners, non-digestible fats or oils, vitamin or minerals and mixtures thereof, preferably, the optional ingredients are selected from the group consisting of salt, sugar, butter, artificial butter or spice flavors, artificial sweeteners, oil, and vegetable pieces, and mixtures thereof.

Additional starch materials may be added also, for example, oat, wheat, rye, barley, corn, masa, cassava, non-masa corn, peanut, dehydrated potato products (e.g., dehydrated potato flakes, potato granules, potato flanules, mashed potato materials, and dried potato products), as well as leguminoses, such as beans, chickpeas, and combinations of thereof. These other starch materials can be blended to make snacks of different compositions, textures, and flavors.

An ingredient that can optionally be added to the dough to aid in its processability is one or more emulsifiers. The addition of an emulsifier to the dough reduces the stickiness of the dough which minimizes sticking to the sheeting rolls, belts, and the like. Emulsifiers also have an effect on the texture of the final product, wherein higher levels of emulsifier result in denser finished products. An emulsifier is preferably added to the dough composition prior to sheeting the dough. The emulsifier can be dissolved in a fat or in a polyol fatty acid polyester such as Olean™. Suitable emulsifiers include lecithin, mono- and diglycerides, diacetyl tartaric acid esters and propylene glycol mono- and diesters and polyglycerol esters. Polyglycerol emulsifiers, such as monoesters of hexaglycerols, can be used. Particularly preferred monoglycerides are sold under the trade names of Dimodan available form Danisco®, New Century, Kans. and DMG 70, available from Archer Daniels Midlands Company, Decatur, Ill.

When calculating the level of optional ingredients, that level of optional ingredient which may be inherent in the vegetable materials and starch material is not included.

2. Dough Preparation

The doughs of some of the embodiments of the present invention can be prepared by any suitable method for forming sheetable doughs. Typically, a loose, dry dough is prepared by thoroughly mixing together the ingredients using conventional mixers. Preferably, a pre-blend of the wet ingredients and a pre-blend of the dry ingredients are prepared; the wet pre-blend and the dry pre-blend are then mixed together to form the dough. Hobart® mixers are preferred for batch operations and Turbulizer® mixers are preferred for continuous mixing operations. Alternatively, non-heated extruders can be used to mix the dough and to form sheets or shaped pieces.

a. Sheeting

Once prepared, the dough is then formed into a relatively flat, thin sheet. Any method suitable for forming such sheets from starch-based doughs can be used. For example, the sheet can be rolled out between two counter rotating cylindrical rollers to obtain a uniform, relatively thin sheet of dough material. Any conventional sheeting, milling, and gauging equipment can also be used. The dough can also be formed into a sheet by a form extrusion device that does not cook the dough.

Doughs are usually formed in to a sheet having a thickness ranging from about 0.020 to about 0.10 inches (from about 0.051 to about 0.25 cm), and preferably to a thickness ranging from about 0.025 to about 0.06 inches (from about 0.063 to about 0.152 cm), and most preferably from about 0.03 inches to about 0.04 inches (0.076 to 0.101 cm).

The pieces may be formed by sheeting and cutting or it may be accomplished by extruding (i.e., a forming extruder) a cylinder of dough and cutting off thin layer, or by other suitable methods, including rotary molding The preferred half-product is sheeted and includes one or more sheets of a particular shape and in the size of the snacks known as hand-to-mouth (HTM), for example, Bugles™.

The dough sheet is then formed into snack pieces of a predetermined size and shape. The snack pieces can be formed using any suitable stamping or cutting equipment. The snack pieces can be formed into a variety of shapes. For example, the snack pieces can be in the shape of ovals, squares, circles, a bowtie, a star wheel, or a pin wheel. The pieces can be scored to make rippled chips as described by Dawes et al. in PCT Application No. PCT/US95/07610, published Jan. 25, 1996 as WO 96/01572.

b. Drying

The snack pieces cut from the sheeted dough described above are then dried to make the half-product described above. The drying process is preferably a slow and gentle process that does not degrade the authentic flavor and nutritional value of the nutritional ingredients. Any of a number of methods of drying can be used, for example, baking, vacuum drying, microwave heating, and mixtures of these is also acceptable. Little or no gelatinization of the starch occurs at this step.

c. Cooking

After the half-products are formed they can be cooked to form a crisp nutritious snack. The cooking step removes the remaining moisture in the half product to provide a snack having a final moisture content of from about 1% to about 3%. This provides the crisp texture. The heating of the half product causes water evaporation in the half product. This causes the product to expand. The final apparent densities range from about 0.3 to 1.1 g/cc, preferably from about 0.04 to 1.0 g/cc, more preferably, from 0.6 to 0.9 g/cc.

The half products can be baked, microwaved, fried, or vacuum baked in an oven to make the nutritious snack. Preferably the half products are finished by baking Baking can be done in a radiant heat oven, a convection oven, or an impingement oven. Conventional home or restaurant ovens may be used as well as commercial units which move the product on a belt through one or more heating zones.

A combination of vacuum baking and conventional baking can also be used.

Microwave cooking can also be used to finish cooking the half product to make the nutritional snack. For example, microwaves that may be used include conventional microwaves, microwaves equipped with halogen lights and combination microwave-convection ovens.

Although not the preferred method, the half-products may be cooked to form a crisp snack chip by frying, for example, in a fat composition comprising digestible fat, non-digestible fat, or mixtures thereof. For best results, clean frying oil should be used. The free fatty acid content of the oil should preferably be maintained at less than about 1%, more preferably less than about 0.3%, in order to reduce the oil oxidation rate. Any other method of cooking, such as baking, vacuum drying, microwave heating, and mixtures of these is also acceptable. When the snack chips are cooked by a method other than frying in oil, it is often desirable to add some oil to the dough as an optional ingredient as described above. Oil can be added to snack chips that are fried as well.

In one embodiment of this invention the dough is made into a fabricated snack product that is dried using microwave heating and then fried to a density from about 0.4 to about 1.0 g/ml.

In a preferred embodiment of the present invention, the frying oil has less than about 30% saturated fat, preferably less than about 25%, and most preferably, less than about 20%. This type of oil improves the lubricity of the finished snack chips such that the finished snack chips have an enhanced flavor display. The flavor profile of these oils also enhances the flavor profile of topically seasoned products because of the oils' lower melting point. Examples of such oils include sunflower oil containing medium to high levels of oleic acid.

In another embodiment of the present invention, the fabricated snack products are fried in a blend of non-digestible fat and digestible fat. Preferably, the blend comprises from about 20% to about 90% non-digestible fat and from about 10% to about 80% digestible fat, more preferably from about 50% to about 90% non-digestible fat and from about 10% to about 50% digestible fat, and still more preferably from about 70% to about 85% non-digestible fat and from about 15% to about 30% digestible fat. Other ingredients known in the art can also be added to the edible fats and oils, including antioxidants such as TBHQ, tocopherols, ascorbic acid, chelating agents such as citric acid, and anti-foaming agents such as dimethylpolysiloxane.

In another embodiment of the present invention, the fabricated snack products are fried in oils with low levels of saturated fat, such as high oleic sunflower oil, corn oil, rice oil, mid oleic sunflower oil, palm oil and mixtures thereof.

It is preferred to fry the fabricated snack products at temperatures of from about 275° F. (135° C.) to about 420° F. (215° C.), preferably from about 300° F. (149° C.) to about 410° F. (210° C.), and more preferably from about 350° F. (177° C.) to about 400° F. (204° C.) for a time sufficient to form a product having about 6% or less moisture, preferably from about 0.5% to about 4%, and more preferably from about 1% to about 3% moisture.

Preferably, the fabricated snack products are fried in oil using a continuous frying method and are constrained during frying. This constrained frying method and apparatus is described in U.S. Pat. No. 3,626,466 issued Dec. 7, 1971 to Liepa. The shaped, constrained snack pieces are passed through the frying medium until they are fried to a crisp state with a final moisture content of from about 0.5% to about 4%, preferably from about 1% to about 2.5%.

Any other method of frying, such as continuous frying or batch frying of the fabricated snack products in a non-constrained mode, is also acceptable. For example, the snack pieces can be immersed in the frying fat on a moving belt or basket. Likewise, frying can occur in a semi-constrained process. For example, the fabricated snack products can be held between two belts while being fried in oil.

Oils with characteristic flavor or highly unsaturated oils can be sprayed, tumbled or otherwise applied onto the fabricated snack products after frying. Preferably triglyceride oils and non-digestible fats are used as a carrier to flavors and are added topically to the fabricated snack products. These include, but are not limited to, butter flavored oils, natural or artificial flavored oils, herb oils, and oils with potato, garlic, or onion flavors added. This method can be used to introduce oils which would ordinarily undergo polymerization or oxidation during the heating necessary to cook the snacks.

The fat content of the finished snack chips of some embodiments of this invention ranges from about 0 grams to about 9 grams per a 28 gram serving of chips. Preferably the fat content of the snack chip is less than about 5 g of fat per a 28 gram serving of chips, and even more preferably, less than about 3 grams of fat for a 28 gram serving. This represents approximately 20 to 50% reduction in the fat content when compared to a chip processed under similar conditions but comprising potato flour, which is typically of 11 g per 28 g serving.

D. Product Characteristics and Analytical Methods

1. Chip Density Test Procedure

The density of the snack product is performed by means of Archimedes' principle (buoyancy method). Density is used in many areas to characterize certain properties of a product or material. The buoyancy method is a technique for measuring the bulk volume of a sample by submerging it in a bath of glycerin and observing the increase in weight of the bath, following Archimedes principle.

Fill a container with enough glycerin to submerge the sample. Submerge a clip in glycerin so that the fine wire is at the interface, and tare the scale.

Carefully determine the weight of each sample with a balance. This weight determination should be made prior to the samples picking up a significant weight of water when exposed to the environment.

Attach the sample to clip and fully submerge in the glycerin, including clip. Make sure the sample does not touch the walls of the vessel. Record the weight. Repeat using 5 different samples times. Calculate density from the following equation:

$$Ds = \frac{Df \times Ws}{(Ws - F)}$$

Where:
Ds=Density of Specimen
Df=Density of Fluid (Glycerin=1.262)

Ws=Weight of Specimen Before Submerging
F=Reading on Scale with Specimen Submerged
An average the 5 density readings is used.

DIAGRAM OF DENSITY EQUIPMENT SETUP

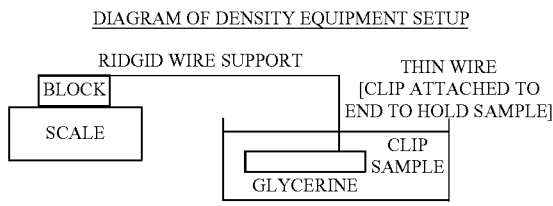

2. % Fat Analysis

The percent of total fat in a chip can be measured by standard procedures known to those in the food arts. Preferably, the total fat is measured by acid hydrolysis. Specifically, the method for measuring total fat by acid hydrolysis can be found in AOAC International (2000) 17th edition AOAC International, Gaithersburg, Md., USA, Official Methods 922.06, 954.02.

3. Water Activity

This method is based on the Rotronic Hygroskop DT (Rotronic Instrument Corp. 160 East Main Street, Huntington, N.Y. 11743) water activity meter, using their sample cell: Model WA-40TH.

Method:
1) Ensure that the temperature gauge on the DT unit displays 25±0.1° C.
If not adjust water bath thermometer until the display shows 25±0.1° C.
2) Put sample in sample cup to cover base up to about 2-3 mm.
3) Put sample cup containing sample in the measuring cell and turn lever all the way to the right to isolate the measuring chamber
4) Wait requisite amount of time until readings stabilize (Only the displays are lit up)-typically 45 min. to a few hrs.
5) Record measurement and remove sample cup from measuring chamber
6) In case of spillage, clean chamber with distilled water and air dry 4. Hardness Measurement A hardness measurement of embodiments of the present can be completed by the following method.

Mounting the Sample
Six test chips are randomly selected from sample.
Each chip is broken up by hand to pieces ranging in size from about ¼" to ½" (Chip edges are avoided in sample preparation).
Chip pieces are then mounted flat in Soy Wax contained in 4" dia. Plastic Petri dishes to ensure stability during testing.
Soy wax (Nature Wax Blend C-3 from Cargill) is used to mount the samples for stability during testing.
Depth is approximately ¼"-⅜" deep.
Soy wax depth is approximately ¼"-⅜", and is allowed to cool and slightly set before adding the chips. This prevents the chip pieces from sinking to the bottom of the dish.
Chip surface is above the wax, and is reasonably flat.
The pieces from 2 chips are placed into each of 3 petri dishes.
Wax with mounted chips is allowed to cool to ambient before testing (usually about 10 minutes).
The Petri dish top is placed over the mounted samples to protect from moisture absorption prior to testing (taping the edges is recommended if more than 1 hour is expected to pass before testing).

Testing:
A texture analyzer (Stable Microsystems, 18 Fairview Road, Scarsdale, N.Y. 10583) is set up to run a test speed=0.1 mm/sec.
A 0.014" (~0.3 min) dia. probe is used for the test (a 0.014" drill bit using the non-fluted end is mounted in a fixture for attachment to the TA).
The probe is set to pass completely through the sample.
Five penetrations are made per Petri dish.
Only 1 penetration per piece.
Penetrations should be >⅛" from any edge.
Avoid obvious areas of inconsistencies (i.e., voids, large bubbles, etc.)
Repeat 5 penetrations for other 2 petri dish samples for a total of 15 penetrations.

Data Analysis
Record the peak force (g) for each penetration.
Average the peak forces measurements.
Discard data points more than 2× the standard deviation from the average. The (standard deviation for most samples should be less than about 25%, but some products have shown standard deviations above 40.

E. Examples 1 and 2

Particular embodiments of the present invention are illustrated by the following non-limiting examples. The following examples were made by a lab bench process.

Table 1 lists the composition and their amounts for two vegetable based snacks according to one embodiments of the present invention. Example 1 is a carrot based snack chip.

A carrot chip is made by first grinding the tapioca such that it passes through a US #30 mesh sieve. The dehydrated carrots are chopped into smaller pieces in a Power Chopper. The carrot puree, the dehydrated carrots, starch and oats are mixed and heated in a microwave for 90 seconds. Cinnamon, brown sugar, butter, salt and citric acid are then mixed in by hand. The total mixture is placed into a Cuisinart© mixer and mixed for approximately 30 seconds until starch is completely blended and a dough is formed.

The dough is then rolled, using a rolling pin, between wax paper to a thickness of from about 0.035 to about 0.40. Circle approximately 2 inches in diameter are cut from the sheeted dough. The circles are placed on stainless steel trays place in Lang forced air oven at about 200 F to a moisture of 10% and the water activity is less than about 0.85 to produce a half-product.

The half-product is finished by baking in an oven. The final product has water activity of about 0.64.

TABLE 1

| | | EXAMPLE Nos. 1-2 | |
| --- | --- | --- | --- |
| | | 1 | 2 |
| Ingredients | Mfg. and Ref # | Dry Wt. % | Dry Wt. % |
| One Minute Oats | Quaker 100% Whole Grain Mar0307L108 | 4.6 | 0 |
| Raw Baby Carrots | Bolthouse Farms | 0 | 15.3 |
| Carrot Puree | Vegetable Juices, Inc. | 40.1 | 0 |

TABLE 1-continued

| Ingredients | Mfg. and Ref # | EXAMPLE No. 1 Dry Wt. % | EXAMPLE No. 2 Dry Wt. % |
|---|---|---|---|
| Dehydrated Carrots | Silva International | 11.50 | 17.1 |
| Dehydrated Jalapeno Peppers | Silva International | 0 | 1.4 |
| Dehydrated Onion | Silva International | 0 | 4.0 |
| Salt | Mortons 1 7B5BA1 non iodized | 0.4 | 0 |
| Cinnamon | Korgers Ground Aug 09 08GB | 0.5 | 0 |
| Minors Chicken Base | Nestle | 0 | 2.4 |
| Unsalted Butter | Land of Lakes | 2.3 | 0 |
| Dark Brown Sugar | Domino 49200 05791 | 5.0 | 0 |
| Citric Acid | | 0.1 | 0 |
| Tapioca Starch <30 mesh | Kraft KFI 11800 80000 | 35.5 | 60 |

INCORPORATION BY REFERENCE

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

All documents cited in the Detailed Description are, in relevant part, incorporated herein by reference; the citation of any document is not to be construed as an admission that it is prior art with respect to the present invention. To the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A fried snack chip consisting essentially of:
    a) from about 15% to about 60% of raw, chopped carrots;
    b) from about 40% to about 65% of tapioca starch material, wherein at least about 40% of the starch material is pre-gelatinized;
    c) from about 0.1% to about 3.0% water; and
    d) from about 1% to about 20% of optional ingredients selected from the group consisting of natural or artificial flavors, oatmeal, fruits, nuts, flavor enhancers, fats and oils, natural sweeteners, artificial sweeteners, emulsifiers, non-digestible fats or oils, vitamin or minerals and mixtures thereof; and wherein the snack chip further consists of 5% to about 60%, by weight of the snack chip, vegetable material derived from raw vegetable materials selected from the group consisting of broccoli, cauliflower, celery, peppers, tomatoes, pumpkin, squash and mixtures thereof and wherein the chip is free from corn flour or potato flour that mask the flavor of the carrots.

2. The snack chip of claim 1 which has from about 0 grams to about 11 grams of fat per 28 grams of chips.

3. The snack chip of claim 1, which has a density of from about 0.3 to 1.0 g/ml.

4. The snack chip of claim 1, which has a fracture strength from about 75 gf to about 500 gf.

* * * * *